United States Patent [19]

Sakon

[11] Patent Number: 5,796,946
[45] Date of Patent: Aug. 18, 1998

[54] MULTI-PROCESSOR SYSTEM BARRIER SYNCHRONIZER NOT REQUIRING REPEATED INTIALIZATIONS OF SHARED REGION

[75] Inventor: Shoichi Sakon, Tokyo, Japan

[73] Assignee: NEC Corporation, Tokyo, Japan

[21] Appl. No.: 339,278

[22] Filed: Nov. 10, 1994

[30] Foreign Application Priority Data

Nov. 29, 1993 [JP] Japan ................... 5-297945

[51] Int. Cl.$^6$ ................................................. G06F 15/16
[52] U.S. Cl. .................. 395/200.19; 395/553; 395/726
[58] Field of Search ................ 395/200.19, 200.08, 395/200.14, 726, 736, 553, 650

[56] References Cited

U.S. PATENT DOCUMENTS

| 5,127,092 | 6/1992 | Gupta et al. | 395/375 |
|---|---|---|---|
| 5,363,495 | 11/1994 | Fry et al. | 395/800 |
| 5,434,995 | 7/1995 | Oberlin et al. | 395/550 |
| 5,448,732 | 9/1995 | Matsumoto | 395/650 |
| 5,452,101 | 9/1995 | Keith | 395/426 |
| 5,475,856 | 12/1995 | Kogge | 395/800 |

OTHER PUBLICATIONS

O'Keefe et al., "Hardware Barrier Synchronization: Static Barrier MIMD (SBM)", 1990 International Conference on Parallel Processing, vol. 1 (1990), pp. 35–42.

*Primary Examiner*—Ayaz R. Sheikh
*Assistant Examiner*—Ario Etienne
*Attorney, Agent, or Firm*—Foley & Lardner

[57] ABSTRACT

Processors in a multi-processor system are synchronized with each other without repeated initializations of a shared region whose value is representative of the number of processors which have reached a synchronized condition. Each processor exclusively accesses the shared region to increment the value kept in the shared region, calculates a comparison value which is based on the value kept in the shared region and which is representative of whether all processors in the multi-processor system have reached the synchronized condition, and examines the comparison value to see if all processors in the multi-processor system have reached the synchronized condition. If so, a branch is made to a next process but, if not, the processor waits until all processors have reached the synchronized condition.

8 Claims, 4 Drawing Sheets

```
       lock              ~ 21
       b=com             ~ 22
       b=b+1             ~ 23
       com=b             ~ 24
       unlock            ~ 25
       n=int ((b+t-1) / t)*t    ~ 26
  L1:  if (b >= n) goto L2      ~ 27
       b=com             ~ 28
       goto L1           ~ 29
  L2:                    ~ 30
```

```
⎧  lock ; b = (com = com + 1) ; unlock    ~ 41
   n = int((b + t-1) / t)*t                ~ 42
⎨  L1 : if (b >= n) goto L2                ~ 43
   b = com                                 ~ 44
   goto L1                                 ~ 45
⎩  L2 :                                    ~ 46
```

```
         lock            ~ 61
           b=com         ~ 62
           b=b+1         ~ 63
           com=b         ~ 64
         unlock          ~ 65
           n=n+t                    ~ 66
      L1: if (b >= n) goto L2       ~ 67
           b=com                    ~ 68
           goto L1                  ~ 69
      L2:                           ~ 70
```

```
      ⎧  lock ; b = (com = com + 1) ; unlock   ~81
      ⎪  n = n + t                              ~82
FIG. 8⎨  L1 : if (b > = n) goto L2              ~83
      ⎪  b = com                                ~84
      ⎪  goto L1                                ~85
      ⎩  L2 :                                   ~86
```

MULTI-PROCESSOR SYSTEM BARRIER SYNCHRONIZER NOT REQUIRING REPEATED INTIALIZATIONS OF SHARED REGION

BACKGROUND OF THE INVENTION

I. Field of the Invention

This invention relates to a barrier synchronizer in a multi-processor system.

II. Description of the Prior Art

In parallel processing by a multi-processor, a sequence control process referred to as barrier synchronization is provided for queueing the termination of parallel operations in all the processors.

In the conventional barrier synchronization, the number of processors to be synchronized is initially set in a shared region (memory or register) capable of access by all the processors. The control in each processor proceeds, upon termination of the parallel operating portion, to lock the shared region, and after subtracting by "1" from a value of the shared region, to release a locked condition of the shared region, thereafter to wait in loop until the shared region reaches a value "0".

Also in the conventional barrier synchronization, an initial value of the shared region is set to "0". The control in each processor proceeds, upon termination of the parallel operating portion, to lock the shared region, and after adding to a value of the shared region by "1", to release the lock of the shared region, thereafter to wait in loop until a value of the shared region reaches the number of processors.

The conventional technique on the barrier synchronization includes Matthew T. O'Keefe and Henry G. Dietz, "Hardware Barrier Synchronization: Static Barrier MIMD (SBM)", 1990 International Conference on Parallel Processing, Vol. 1, pp. 35–42, 1990.

In the conventional example in the foregoing, with a plurality of times of barrier synchronizations taken, a problem arises in producing overhead which every time initializes the shared region among the processors.

SUMMARY AND OBJECTS OF THE INVENTION

An object of the invention is to improve a performance of parallel processing programs by reducing overhead so that the repeat synchronizations can be taken without initialization of the shared region.

Another object of the invention is to perform a barrier synchronization using a shared region together with a lock which an ordinary multi-processor possesses without preparing any particular hardware for taking synchronization.

In a barrier synchronizer of a multi-processor system of a first aspect of the present invention, each processor constituting the multi-processor system comprising:

- a lock means for exclusively controlling a shared region among each processor;
- a read means for reading value of the shared region among the processors in an exclusive control partition by the lock means;
- an adding means for adding a predetermined value, for example, "1" to a value thus read by the read means in the exclusive control partition by the lock means;
- a write means for writing the added value by the adding means to the shared region among the processors in the exclusive control partition by the lock means;
- a calculation means for calculating a next barrier value which is a value of the shared region at the time that all the processors reach synchronized condition in accordance with the calculated value of the adding means;
- a comparison means for comparing the added value of the adding means with a next barrier value thus calculated by the calculation means; and
- a branch means which branches to a next process when it is determined that all the processors reach a synchronized condition as a result of the comparison means and which is in queueing state until all the processors reach a synchronized condition when it is determined that all the processors do not reach a synchronized condition.

A barrier synchronizer of a multi-processor system of a second aspect of the invention, in the first aspect, an exclusive increment/decrement means for the shared region among the processors is provided.

A barrier synchronizer of a multi-processor system of a third aspect of the invention, in the first aspect, comprises a calculation means for calculating a next barrier value from a value of a region held at every processor basis.

A barrier synchronizer of a multi-processor system of a fourth aspect of the invention, in the first aspect, comprises, an exclusive increment/decrement means for a shared region among the processors; and a calculation means for calculating a next barrier value from a value of a region held at every processor basis.

BRIEF DESCRIPTION OF THE DRAWINGS

The invention will be understood more fully from the detailed description given here below and from the accompanying drawings of preferred embodiments of the invention, which, however, should not be considered as limiting the invention but are for explanation and understanding only.

FIG. 8 shows a program for executing barrier synchronization between multi-processor systems of the fourth embodiment according to the invention.

Here, it should be noted that like reference numerals represent like elements throughout the disclosure.

DETAILED DESCRIPTION OF PREFERRED EMBODIMENTS

Figures 1, 2:
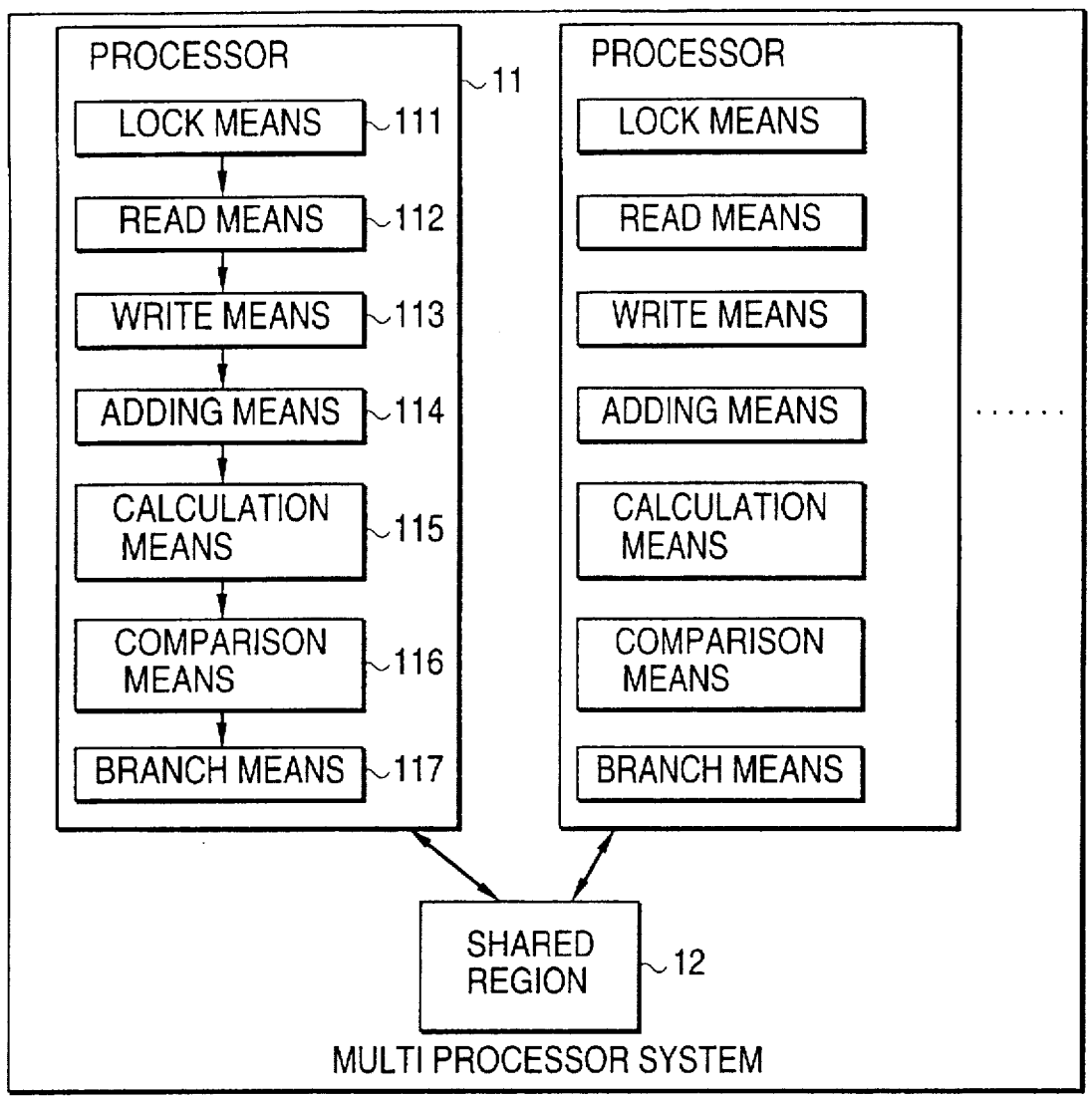
FIG. 1 is a block diagram showing a first embodiment according to the invention.
FIG. 2 shows a program for executing barrier synchronization between multi-processor systems of the first embodiment according to the invention.

One embodiment according to the invention is described in detail referring to the drawings.

Referring to FIG. 1, a multi-processor system barrier synchronizer of a first embodiment comprises a plurality of processors constituting the multi-processor system and a shared region 12 shared among the processors. A processor 11 comprises a lock means 111 for performing an exclusive control in relation with another processor, a read means 112 for reading a value of the shared region 12, an adding means 114 for adding by 1 to the value of the shared region 12, a write means 113 for writing a value into the shared region 12, a calculation means 115 in which a next barrier value, a value of the shared region 12 when all the processors reach synchronization is calculated in accordance with the value of the shared region 12, a comparison means 116 for comparing the read value of the shared region 12 with the calculated value of the next barrier, and a branch means 117 which branches to a next operation in case where, as a result of the comparison, execution of parallel operating portions in all the processors terminates (hereinafter referred to as "reaches a barrier point"), and which branches for reading and comparing the value of the shared region 12 again in case where all the processors do not reach the barrier point.

FIG. 2 shows a program for the processor 11 to execute barrier synchronization. When each processor in the parallel processing executes such a program, the other processors are to queue a termination of execution of the parallel operating portions of all the processors. The number given to each processing in FIG. 2 corresponds to each step of hereinafter described embodiments.

Operation of the first embodiment according to the invention is described referring to FIGS. 1 and 2.

In step 21, the lock means 111 of the processor 11 locks the shared region 12, so that the shared region 12 is required to be exclusively renewed.

In step 22, the read means 112 reads a value of the shared region 12 (hereinafter "com"), and stores it into a variable "b". The variable "b" is assigned to either one of a local memory or a register in the processor. A value of the shared region com is initialized to "0" in advance.

In step 23, the adding means 114 adds by "1" on a value of variable "b".

In step 24, the write means 113 writes back the value of variable "b" into the shared region com.

In step 25, the lock means 111 unlocks.

In steps 21 to 25, the value of the shared region com is added by "1" every time each processor constituting the multi-processer system executes this program. That is, the com value designates an accumulated value of the number of processors which have reached the barrier point.

In step 26, the calculating means 115 calculates the com value of the shared region (referred to as "next barrier value") at the time that all the processors reach the barrier point, and substitutes it into a variable "n", on the basis of the following calculation formula, in accordance with the variable "b"added by "1" on the shared region com value read by each processor, where "n" is assigned to either one of the local memory or the register in the processor, $$int\left(\frac{b+t-1}{t}\right) * t$$

where "t" represents the number of processors performing parallel processes, which is stored into either one of the local memory or the register of each processor. By the calculation formula, the minimum value is obtained from multiples of "t" but equal to or more than "b". Thus obtained is a corn value at the time that a final processor reaches the barrier synchronization program.

In step 27, the comparison means 116 compares variable "b" with variable "n", and when variable "b" is equal to or more than variable "n", it is determined that all the processor has reached the barrier point, the branch means 117 branches to a label L2 for escaping from the loop. That is, such a comparison condition is established by executing step 27 only when all the processors reach the barrier point.

In step 28, when variable "b" is lower than variable "n", or some processors do not reach the barrier point, then the read means 112 again reads the value of the shared region corn into variable "b".

In step 29, the branch means 117 branches to a label L1, and again repeats execution of step 27.

The processing from steps 27 to 29 provides queueing until all the processors reach the barrier point.

When the processor intends to continue a next barrier synchronization, the barrier synchronization can be performed using the same program needless to initialize the shared region.

In the foregoing, the processing, which is a process of the first embodiment of the invention, of the multi-processor system barrier synchronizer is terminated.

A feature of the barrier synchronizer of the multi-processor system which is the first embodiment of the invention, resides in that, in an intended execution of parallel processing by each processor, the lock means 111 locks the shared region 12 shared among the processors, a value of the shared region 12 is added by "1" by the read means 112, adding means 114, and write means 113, thereafter a lock of the shared region 12 is released, in addition, the calculation means 115 calculates the value of the shared region 12 at the time that all the processors reach the barrier point in accordance with the updated value of the shared region 12, the comparison means 116 compares the value of the shared region 12 at that instant with the calculated value of shared region 12, and when the value of the shared region 12 at that instant does not reach the calculated value of shared region 12, the loop is formed for executing again the comparison means 116, so as to wait to reach the barrier point.

With this structure employed, the barrier synchronizer of the multi-processor system of the first embodiment of the invention is, in effect, capable of reducing the overhead on repeating the synchronizing operations because the repeat synchronizing operations are made available without initialization of the shared region.

Figures 3, 4:
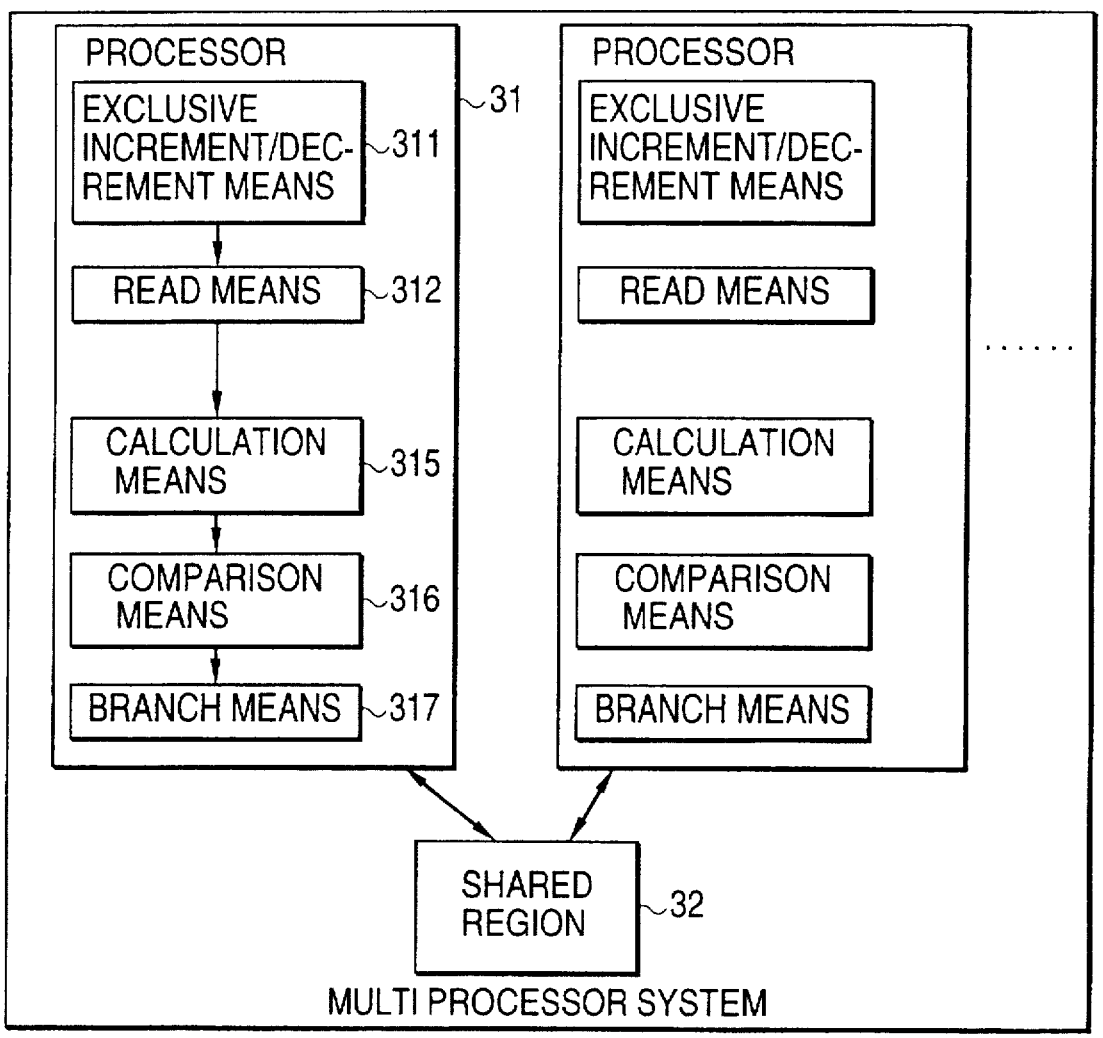
FIG. 3 is a block diagram showing a second embodiment according to the invention.
FIG. 4 shows a program for executing barrier synchronization between multi-processor systems of the second embodiment according to the invention.

In FIG. 3, a multi-processor system barrier synchronizer of a second embodiment of the invention is formed from the multi-processor system barrier synchronizer of the first aspect of the invention where, however, the lock means 111 and write means 113 and adding means 114 are replaced by an exclusive increment/decrement means 311. In detail, the multi-processor system barrier synchronizer of the second embodiment comprises a plurality of processors constituting the multi-processor system and a shared region 32 shared among the processors. A processor 31 comprises the exclusive increment/decrement means 311 for exclusively incrementing a value of a shared region 32, a read means 312 for reading a value of the shared region 32, a calculation means 315 for calculating a next barrier value which is a value of the shared region 32 at the time that all the processors reach a barrier point in accordance with thus read value of the shared region 32, a comparison means 316 for comparing the read value of the shared region 32 with the calculated value of the next barrier, and a branch means 317 which branches into a next operation in case where all the processors reach the barrier point as a result of the comparison and which branches for again reading and comparing the value of the shared region 32 in case where all the processors do not reach the barrier point.

FIG. 4 shows a program for the processor 31 to perform a barrier synchronization. When each processor now being parallelly processing, executes this program, the other processors are in queueing until the parallel operating portions of all the processors terminate the execution. Numerals given to each process in FIG. 4 correspond to each step in embodiments as hereinafter described.

Operation of the second embodiment according to the invention is described referring to FIGS. 3 and 4.

In this embodiment, the steps 21, 22, 23, 24 and 25 of the first embodiment are replaced by step 41 using the exclusive increment/decrement means.

In step 41, the exclusive increment/decrement means 311 exclusively increments a value of com of the shared region 31 and substitutes thus incremented value into variable "b".

Hereinafter, operations of steps 42, 43, 44, 45 and the step 46 are the same as those of steps 26, 27, 28, 29 and 30 of the first embodiment. Thereby, a barrier synchronization can be performed.

In the foregoing, there terminates the operation of the multi-processor system barrier synchronizer of the second embodiment of the invention.

A feature of the barrier synchronizer of the multi-processor system which is the second embodiment of the invention, resides in that, in an execution of parallel processing by each processor, the exclusive increment/decrement means 311 locks the shared region 32 shared among the processors, a value of the shared region 32 is added by "1", thereafter a locked condition of the shared region 32 is released, in addition, the calculation means 315 calculates the value of the shared region 322 at the time that all the processors reach the barrier point in accordance with thus added value of the shared region 32, the comparison means 316 compares the value of the shared region 32 at that instant with the calculated value of shared region 32, and when the value of the shared region 32 at that instant does not reach the calculated value of shared region 32, the loop is formed for executing again the comparison means 116, and for waiting to reach the barrier point.

In effect with such structure employed, the barrier synchronizer of the multi-processor system of the second embodiment of the invention is, similar to the first embodiment, capable of reducing the overhead on repeating the synchronizing operations because the repeat synchronizing operations are available without initialization of the shared region.

Figures 5, 6:
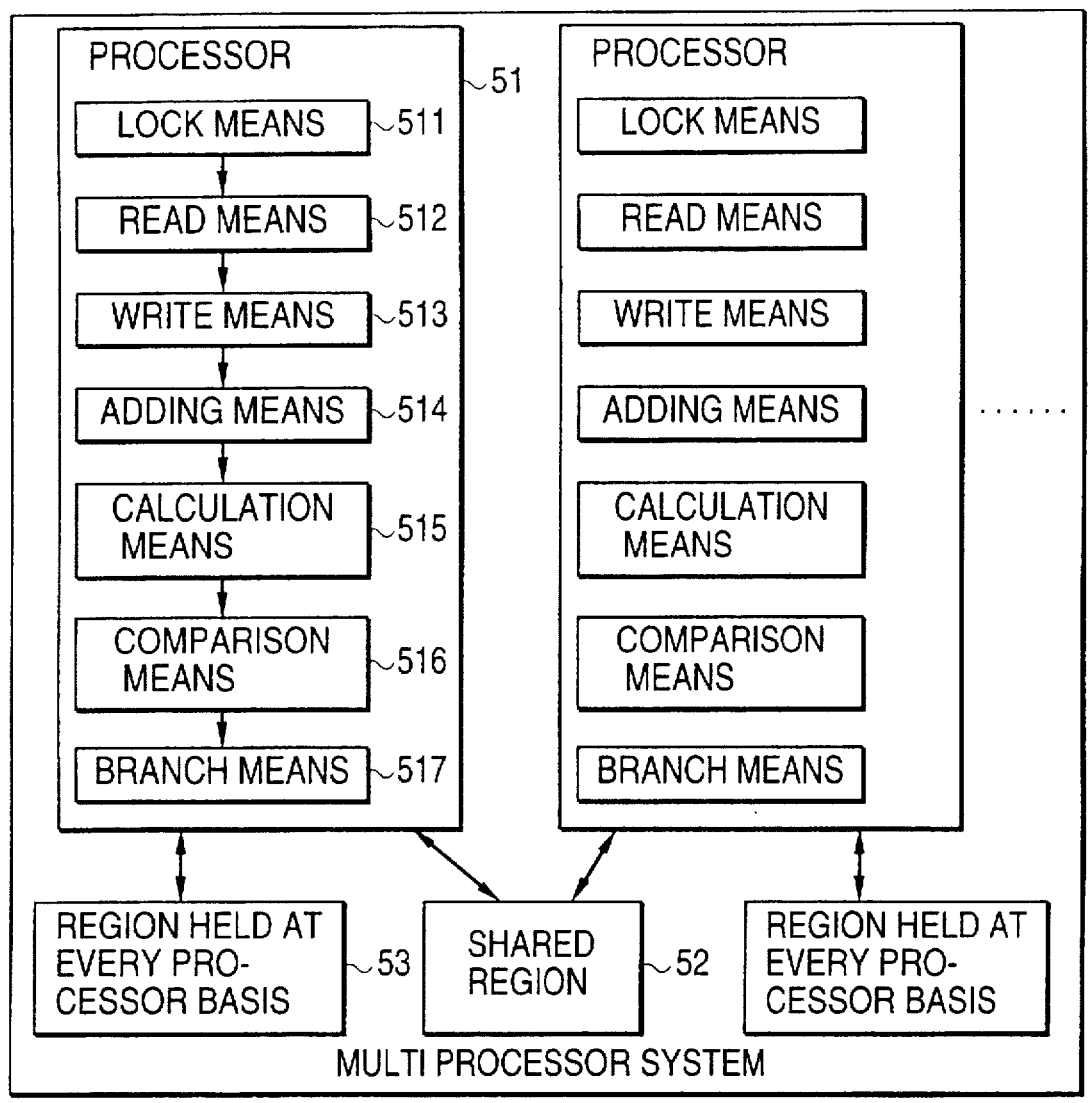
FIG. 5 is a block diagram showing a third embodiment according to the invention.
FIG. 6 shows a program for executing barrier synchronization between multi-processor systems of the third embodiment according to the invention.

In FIG. 5, a multi-processor system barrier synchronizer of a third embodiment of the invention, formed from the multi-processor system barrier synchronizer of the first aspect of the invention where, however, each processor includes a region 53 which is held at every processor basis. The multi-processor system barrier synchronizer of the third embodiment comprises a plurality of processors constituting the multi-processor system and a shared region 52 shared among the processors and the region 53 held by the processors at every processor basis. A processor 51 comprises a lock means 511 for performing an exclusive control in relation with another processor, a read means 512 for reading a value of the shared region 52, an adding means 514 for adding by 1 to thus read value of the shared region 52, a write means 513 for writing a value into the shared region 52, a calculation means 515 in which a next barrier value, a value of the shared region 52 when all the processors reach synchronization is calculated in accordance with thus read value of the shared region 53, a comparison means 516 for comparing the read value of the shared region 52 with the calculated value of the next barrier, and a branch means 517 which branches to a next operation in case where, as a result of the comparison, all the processors reach the barrier point and which branches for again reading and comparing the value of the shared region 52 in case where all the processors do not reach the barrier point.

FIG. 6 shows a program by which the processor 51 performs barrier synchronization. When each processor in parallel processing executes this program, the other processors is to queue a termination of execution of the parallel operating portions of all the processors. The number given to each process in FIG. 6 corresponds to each step of hereafter described embodiments.

Operation of the third embodiment of the invention is described referring to FIGS. 5 and 6.

In this embodiment, the step 26 of the first embodiment is replaced by a step 66.

In step 66, by adding the number "t" of programs to a barrier value "n" (an initialization value is assumed to be "0") held at every program basis, a next barrier value is obtained.

Steps 61, 62, 63, 64, 65, 67, 68, 69 and 70 in this embodiment are the same as the steps 21, 22, 23, 24, 25, 27, 28, 29 and 30 in the first embodiment. Thereby, the barrier synchronization can be performed.

In the foregoing, there terminates the processing of the multi-processor system barrier synchronizer of the third embodiment of the invention.

A feature of the barrier synchronizer of the multi-processor system which is the third embodiment of the invention, resides in that, in an execution of parallel processing by each processor, the lock means 511 locks the shared region 52 shared among the processors, a value of the shared region 52 is added by "1" by the read means 512, adding means 514, and write means 513, thereafter a locked condition of the shared region 52 is released, in addition, the calculation means 515 calculates the value of the shared region 52 at the time that all the processors reach the barrier point in accordance with a value of the shared region 53 held at every processor basis, the comparison means 516 compares the value of the shared region 52 at that instant with the calculated value of shared region 52, and when the value of the shared region 52 at that instant does not reach the calculated value of shared region 52, the loop is formed for executing again the comparison means 516, and for waiting to reach the barrier point.

In effect with such structure employed, the barrier synchronizer of the multi-processor system of the third embodiment of the invention is, similar to the first embodiment, capable of reducing the overhead on repeat synchronization because the repeat synchronizing operations are available without initialization of the shared region.

Figure 7:
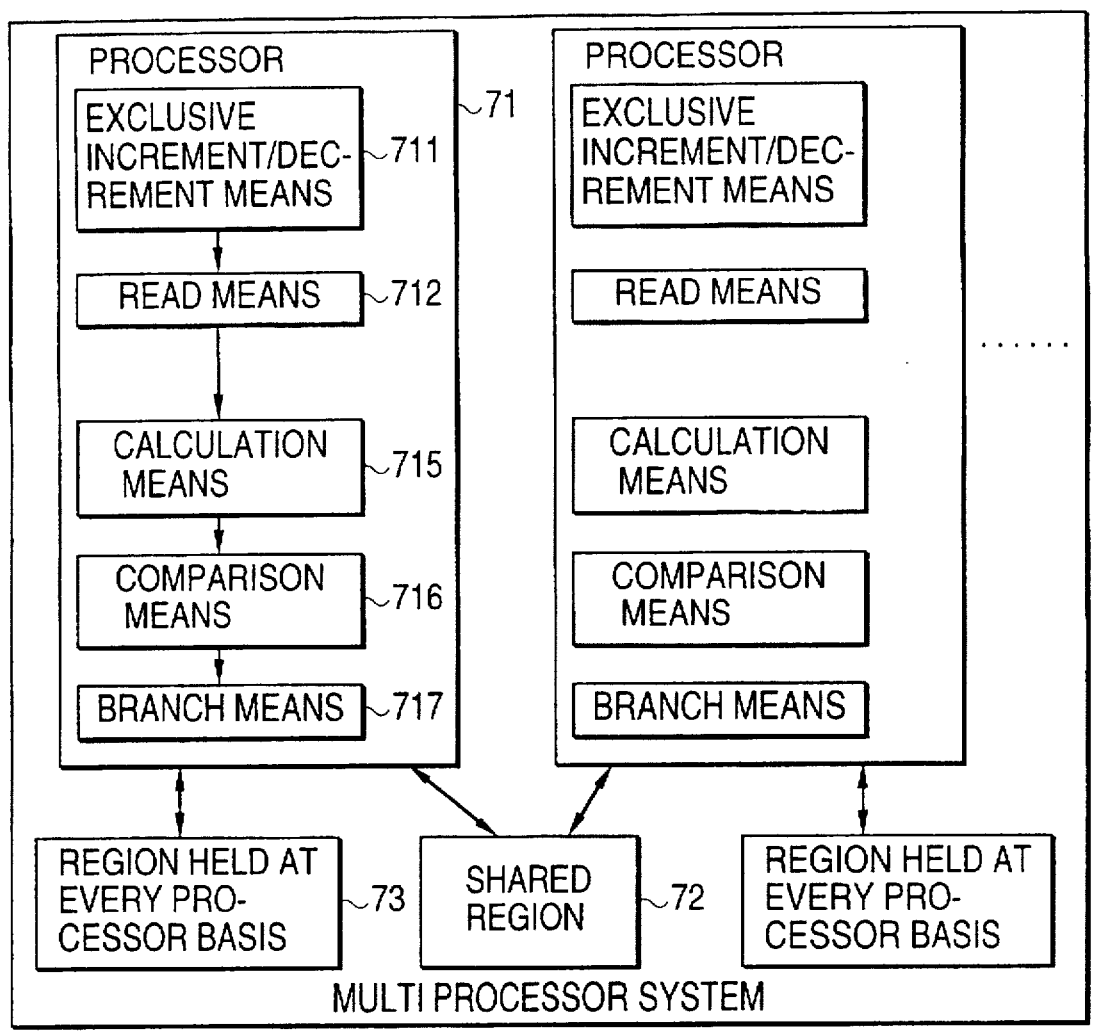
FIG. 7 is a block diagram showing a fourth embodiment according to the invention.

FIG. 7, a multi-processor system barrier synchronizer of a fourth embodiment of the invention is formed from the multi-processor system barrier synchronizer of the first aspect of the invention where, however, the lock means 111 and write means 113 and adding means 114 are replaced by an exclusive increment/decrement means 711, further including a region 73 held by each processor at every processor basis. In detail, the multi-processor system barrier synchronizer of a fourth embodiment comprises a plurality of processors constituting the multi-processor system and a shared region 72 shared among the processors and a region 73 held by each processor at every processor basis. A processor 71 comprises the exclusive increment/decrement means 711 for exclusively incrementing a value of a shared region 72, a read means 712 for reading a value of the shared region 72, a calculation means 715 for calculating a next barrier value which is a value of the shared region 72 at the time that all the processors reach a barrier point in accordance with a value of the shared region 73 held at every processor basis, a comparison means 716 for comparing the read value of the shared region 72 with the calculated value of the next barrier, and a branch means 717 which branches into a next operation in case where all the processors reach the barrier point as a result of comparison and which branches for again reading and comparing the value of the shared region 72 in case where all the processors do not reach the barrier point.

FIG. 8 shows a program for the processor 71 to perform a barrier synchronization. When each processor now being parallelly processing, executes this program, the other processors are in queueing until the parallel operating portions of all the processors terminate the execution. Numerals given to each process in FIG. 8 correspond to each step in the embodiment as hereinafter described.

Operation of the fourth embodiment according to the invention is described referring to FIGS. 7 and 8.

In this embodiment, the steps 21, 22, 23, 24 and 25 of the first embodiment are replaced by step 81 using the exclusive increment/decrement means 711.

In step 81, the exclusive increment/decrement means 711 exclusively increments and decrements a value of com of the shared region 71 and substitutes thus incremented value into variable "b".

In this embodiment, the step 26 in the first embodiment is replaced by step 82.

In step 82, the next barrier value is obtained by adding the number "t" of processors to barrier value "n" (an initializing value is assumed to be "0") held at every processor basis.

Processes in steps 83, 84, 85, and 86 in this embodiment are the same as those of steps 27, 28, 29 and 30 of the first embodiment respectively. Thereby, a barrier operation can be performed.

In the foregoing, there terminates the operation of the multi-processor system barrier synchronizer of the fourth embodiment of the invention.

A feature of the barrier synchronizer of the multi-processor system which is the fourth embodiment of the invention, resides in that, in an execution of parallel processing by each processor, the exclusive increment/ decrement means 711 locks the shared region 72 shared among the processors, a value of the shared region 72 is added by "1", thereafter a locked condition of the shared region 72 is released, in addition, the calculation means 715 calculates the value of the shared region 72 at the time that all the processors reach the barrier point in accordance with a value of the shared region 73 held at every processor basis, the comparison means 716 compares the value of the shared region 72 at that instant with the calculated value of shared region 72, and when the value of the shared region 72 at that instant does not reach the calculated value of shared region 72, the loop is formed for executing again the comparison means 716, and for waiting to reach the barrier point.

In effect with such structure employed, the barrier synchronizer of the multi-processor system of the fourth embodiment of the invention is, similar to the first embodiment, capable of reducing the overhead on repeating the synchronizing operations because the repeat synchronizing operations are available without initialization of the shared region.

As hereinbefore fully described, in effect, the present invention is capable of improving a performance of parallel processing program as a result of reducing the overhead on repeating the synchronizing operations because the repeat synchronizing operations are made available without initialization of the shared region.

Furthermore, the invention is to perform barrier synchronization using the lock and the shared memory which the ordinary multi-processor possesses, without preparing any particular hardware for obtaining synchronization.

Although the invention has been described in detail above in connection with various preferred embodiments thereof, it will be understood by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A barrier synchronizer of a multi-processor system having a plurality of processors and a shared region shared by each of said processors, each processor comprising:
    a lock means for exclusively locking the shared region;
    a read means for reading a value of the shared region locked by the lock means;
    an adding means for adding a predetermined value to said value to generate an added value;
    a write means for writing the added value to the shared region;
    a calculation means for calculating a next barrier value based on the added value, the next barrier value representing a value of the shared region at a time when all the processors will have reached a synchronized condition;
    a comparison means for comparing the added value with the next barrier value; and
    a branch means for branching to a next process when said comparison means determines that all the processors have reached the synchronized condition, and for queuing until all the processors have reached the synchronized condition when said comparison means determines that all the processors have not reached the synchronized condition.

2. The barrier synchronizer of a multi-processor system according to claim 1, wherein said lock means, said read means, said adding means, and said write means operate exclusively.

3. The barrier synchronizer of a multi-processor system according to claim 2, wherein each processor further comprises a local region, and wherein said calculation means calculates the next barrier value based on a value stored in the local region.

4. The barrier synchronizer of a multi-processor system according to claim 1, wherein each processor further comprises a local region, and wherein said calculation means calculates the next barrier value based on a value stored in the local region.

5. In a multi-processor system having a plurality of processors and a shared region shared by each of said processors, a synchronization method executed by each of said processors, said method comprising the steps of:

exclusively locking the shared region;

reading a value of the shared region locked;

adding a predetermined value to said value to generate an added value;

writing the added value to the shared region;

calculating a next barrier value based on the added value, the next barrier value representing a value of the shared region at a time when all the processors will have reached a synchronized condition;

comparing the added value with the next barrier value; and branching to a next process if said comparing determines that all the processors have reached the synchronized condition and queuing until all the processors have reached the synchronized condition if said comparing determines that all the processors have not reached the synchronized condition.

6. The method according to claim 5, wherein the steps of locking, reading, adding, and writing are operated exclusively.

7. The method according to claim 6, wherein the multiprocessor system further includes a local region for each of the processors, and wherein the step of calculating includes calculating the next barrier value based on a value stored in the local region.

8. The method according to claim 5, wherein the multiprocessor system further includes a local region for each of the processors, and wherein the step of calculating includes calculating the next barrier value based on a value stored in the local region.

* * * * *